COMPUTER CONTROLLED ALTERNATING-CURRENT BRIDGE-TYPE IMPEDANCE MEASUREMENT SYSTEM FOR ELECTRICAL CIRCUIT COMPONENTS

Filed June 19, 1964 4 Sheets-Sheet 1

INVENTORS.
IRVIN J. SATTINGER
WILLIAM H. LAWRENCE
JEROME S. ROGACZEWSKI
BY: Harry M. Saragovitz, Edward J. Kelly, Herbert Berl & S. Dubroff
ATTORNEYS.

INVENTORS.
IRVIN J. SATTINGER
WILLIAM H. LAWRENCE
JEROME S. ROGACZEWSKI
BY: Harry M. Saragovitz, Edward J. Kelly, Herbert Berl & S. Dubroff
ATTORNEYS.

May 9, 1967 I. J. SATTINGER ET AL 3,319,162
COMPUTER CONTROLLED ALTERNATING-CURRENT BRIDGE-TYPE IMPEDANCE
MEASUREMENT SYSTEM FOR ELECTRICAL CIRCUIT COMPONENTS
Filed June 19, 1964 4 Sheets-Sheet 3

*INVENTORS*
IRVIN J. SATTINGER
WILLIAM H. LAWRENCE
JEROME S. ROGACZEWSKI
BY: Harry M. Saragovitz, Edward J. Kelly, Herbert Berl & S. Dubroff
ATTORNEYS.

INVENTORS.
IRVIN J. SATTINGER
WILLIAM H. LAWRENCE
JEROME S. ROGACZEWSKI
BY
ATTORNEY

United States Patent Office 3,319,162

Patented May 9, 1967

3,319,162

COMPUTER CONTROLLED ALTERNATING-CURRENT BRIDGE-TYPE IMPEDANCE MEASUREMENT SYSTEM FOR ELECTRICAL CIRCUIT COMPONENTS

Irvin J. Saffinger, Ann Arbor, William H. Lawrence, Saline, and Jerome S. Rogaczewski, Dearborn, Mich., assignors, by mesne assignments, to the United States of America as represented by the Secretary of the Army Filed June 19, 1964, Ser. No. 376,602

4 Claims. (Cl. 324—57)

Figure 1:
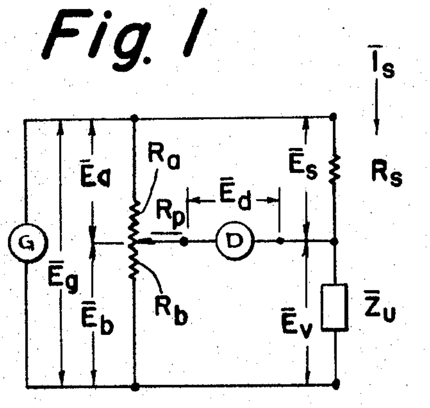

This invention relates to checkout systems which are utilized to locate faults in the circuits of various types of electrical equipment. It has for its primary object to provide a bridge-measurement type of checkout system which may be operated either manually or under the control of digital computer means to test for such faults. Suitable digital computer means for controlling the operation of this bridge-measurement type of checkout system is disclosed in a patent of Albert Chalfin and Raymond J. Brachman, No. 3,237,100, issued Feb. 22, 1966 for A Computer-Controlled Apparatus for Composite Electrical and Electronic Equipment.

The present invention relates more particularly to alternating-current bridge-type measurement systems, and has for its primary object to provide an improved alternating-current bridge-type measurement or impedance comparator system for electrical circuit components which has a finite null output voltage response related to the reactive impedance of such components in one branch of the bridge circuitry of said system. This is mainly for the reason that the null voltage at balance is related to the difference between the effective resistance in said one branch and a standard branch of the bridge circuitry. Thus the present impedance comparator system differs in principle from conventional impedance bridge networks in that the reactive impedance of the tested electrical circuit component is not balanced out. Instead of this, the magnitude of a null voltage is used to measure the reactance of said circuit component. This has the advantage that only one balance adjustment is involved.

The invention will be better understood from the following description when considered in connection with the accompanying drawings and its scope is indicated by the appended claims.

Figure 2:
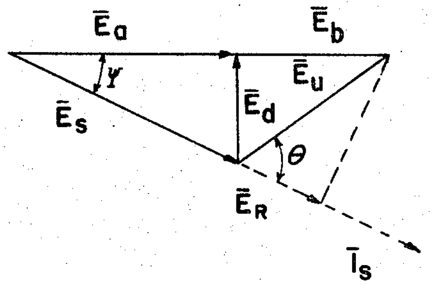

In the drawings:

FIG. 1 is a circuit diagram of a basic impedance comparator system in accordance with the invention, the impedance to be measured being indicated by the symbol $\overline{Z}_u$, the bar over a symbol indicating that it is a complex quantity, FIG. 2 is an example of a phasor diagram of the voltages in the bridge circuit of FIG. 1, showing the detector voltage $\overline{E}_d$ at null.

Figure 3:
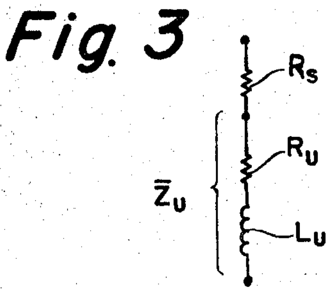
Figure 4:
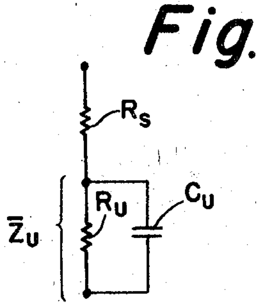
Figure 5:
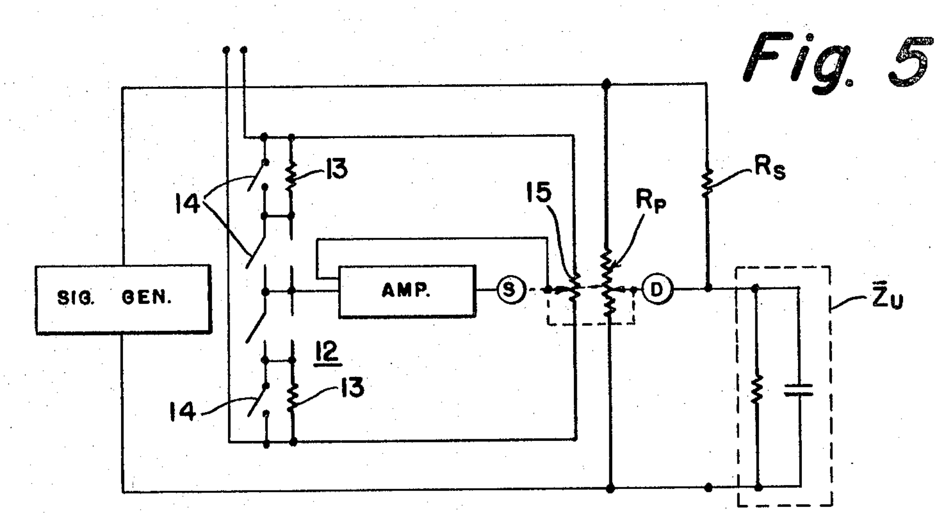
Figure 6:
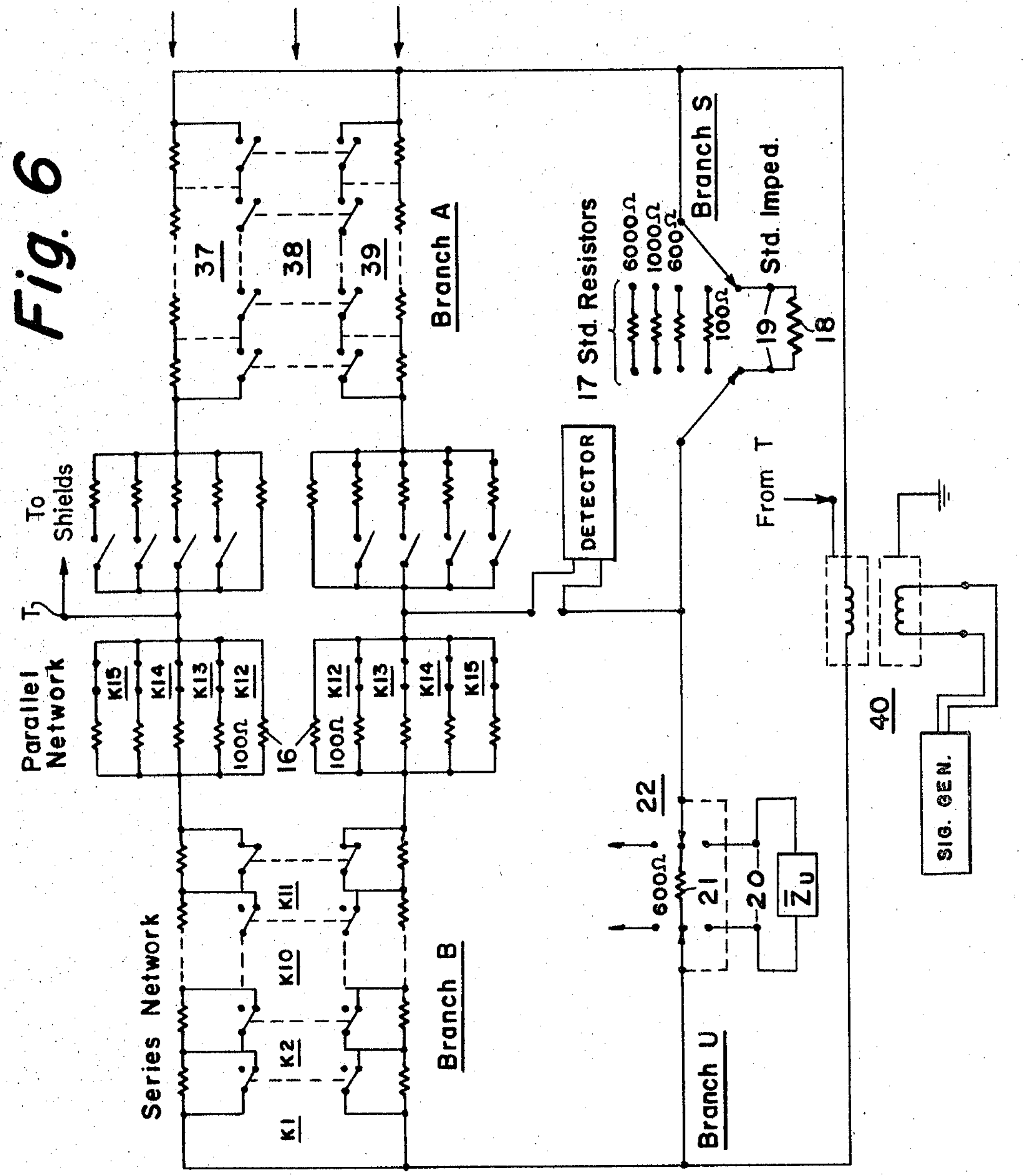
Figure 7:
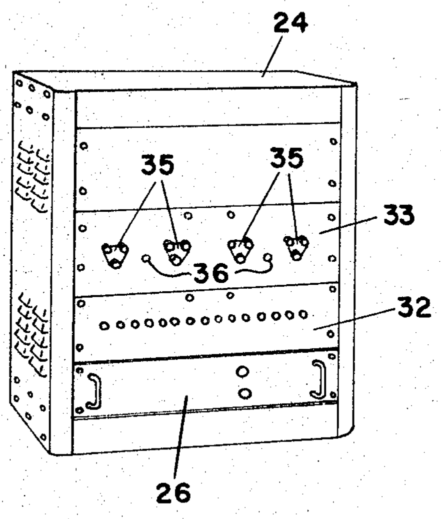
Figure 8:
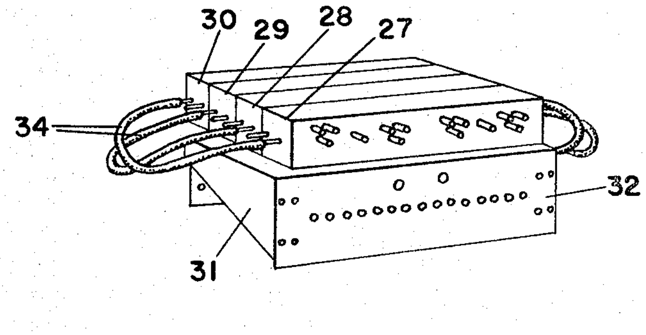

FIGS. 3 and 4 represent two typical circuit component configurations of unknown impedance, i.e., having series inductance and parallel capacitance characteristics, FIG. 5 shows an alternate impedance comparator system like that of FIG. 1 but adapted for computer control, FIG. 6 is a further and more detailed circuit diagram of the impedance comparator of the present invention, FIG. 7 is a front view in perspective, of a comparator in accordance with the invention, FIG. 8 is a front view, in perspective, of subchassis elements mounted on a base, and FIGS. 9, 10, 11 and 12 are explanatory circuit diagrams.

Referring to FIG. 1 and the basic circuit of the comparator, the symbol $\overline{Z}_u$ represents an unknown impedance element to be evaluated, and the symbol $R_s$ represents a resistor of known value. In this and others of the figures herein described, a bar over a symbol indicates a complex quantity. The impedance element and the resistor are connected in series, and a potentiometer $R_p$ is connected in parallel therewith. A sensitive A.-C. meter or detector D has one of its terminals connected to the junction between the impedance element and the resistor and the other of its terminals connected to the movable contact of the potentiometer. A signal generator G is connected across the diagonals of the resulting bridge circuit.

The circuit of FIG. 1 is intended for the measurement of the reactive component of networks having a very small Q factor, i.e., a phase angle $\psi << 1$. This circuit differs from the usual A.-C. bridge in that, ideally, none of the branches contain reactance except the unknown impedance element or unit $\overline{Z}_u$. Under these conditions, the voltage across the detector D will pass through a minimum at the fundamental frequency as the potentiometer is adjusted, but will not go to zero. This minimum voltage is hereinafter called the null voltage.

The phasor diagram of FIG. 2 indicates the voltages in the comparator, the detector voltage $\overline{E}_d$ being at a null and the angles being greatly exaggerated for the sake of clarity. From this diagram, it can be seen that $$\overline{E}_g = \overline{E}_a + \overline{E}_b$$

$$\overline{E}_u = \overline{E}_R + j\overline{E}_x$$

The angle $\psi$ is given by $$\tan \psi = \frac{E_d}{E_a} \quad (1)$$

A positive value for $\psi$ corresponds to an inductive effect, and a negative value corresponds to a capacitative effect. The relationship between $\psi$ and the bridge elements is shown for two typical configurations in FIGS. 3 and 4.

FIG. 3 shows a series inductance connection for the unknown impedance element or unit $\overline{Z}_u$. Assuming the detector current to be negligible $$\overline{Z}_u = R_u + j\omega L_u$$

$$\tan \theta = L_u \frac{\omega}{R_u}$$

$$R_s + \overline{Z}_u = (R_s + R_u) + j\omega L_u$$

$$\tan \psi = L_u \frac{\omega}{R_s + R_g} \quad (2)$$

FIG. 4 shows a parallel capacitance connection for the impedance unit $\overline{Z}_u$. Assuming the detector current to be negligible $$\overline{Z}_u = \frac{1}{G_u + j\omega C_u} = \frac{R_u(1 - j\omega C_u R_u)}{1 + (\omega C_u R_u)^2} \doteq R_u - j\omega C_u R_u^2$$

$$\tan \theta = -C_u \omega R_u$$

$$\left.\begin{aligned} R_s + \overline{Z} &\doteq (R_s + R_u) - j\omega C_u R_u^2 \\ \tan \psi &\doteq -C_u \frac{\omega R_u^2}{R_s + R_u} \end{aligned}\right\} \omega C R_u << 1 \quad (3)$$

Combining Equation 1 with Equation 2, and solving for $L_u$, gives $$L_u = \frac{E_d}{E_a} \cdot \frac{R_s + R_u}{\omega} \quad (4)$$

Combining Equation 1 with Equation 3, and solving for $C_u$, gives $$C_u \doteq \frac{E_d}{E_a} \cdot \frac{R_s + R_u}{\omega R_u^2}; \omega C R_u << 1 \quad (5)$$

where $L_u$ and $C_u$ are the unknown inductance and capacitance respectively, connected as shown in FIGS. 3 and 4.

In order to determine the values of $L_u$ or $C_u$, a set of bridge measurements is made for known values of $R_s$ and $\omega$. The potentiometer is first adjusted to obtain a minimum value of $E_d$. The resistive component, $R_u$, of the unknown is equal to $R_sR_b/R_a$. The voltages $E_d$ and $E_a$ are obtained by measurement. The voltage across the standard branch, $E_s$, may be substituted for $E_a$ in Equations 1, 4 and 5 when $\psi << 1$.

The sign of the angle $\psi$ was not determined by the method described above because only the magnitude of the null voltage $\bar{E}_d$ was used. For application to automatic testing systems it may not be necessary to determine the sign independently, since the general character of the component to be evaluated is usually known. However, the sign of the angle can be evaluated by means of additional tests, e.g., by placing a known reactance across one of the branches and noting the change in the null, or by using a phase-sensitive meter for the null detector.

The bridge-measurement method is not restricted to determining the resistance and reactance of a single reactive component. The method can be used for more complex circuits containing reactive components of small magnitude. For such circuits an appropriate set of equations must be derived and inserted into the computer program. The versatility of the method depends on the number of access points available in the circuit under test; for example, a network which has only two accessible terminals can be tested to determine a single reactive component. If more than one reactive component is present, it will not be possible to check the individual values but only to determine whether the combined effect of the two components is correct.

Either of two circuits may be used for the control of the impedance comparator. The first and preferred circuit is shown by FIGS. 1 and 6. The other is illustrated by FIG. 5. In the first circuit, a relay-operated voltage-divider is used as the balancing arm of the bridge. In the other, a relay-operated voltage divider circuit controls the bridge through a servo system.

As indicated by FIG. 5, the balancing arm of the bridge consists of a potentiometer $R_p$, connected across the A.-C. signal generator. The arm of this potentiometer is mounted on or otherwise connected with the output shaft of a servo motor S. The servo system controls the position of the potentiometer arm in accordance with the operation of a relay-operated voltage-divider circuit 12. This consists of a series-parallel combination of precision resistors 13, each of which is shunted by relay contacts 14. The opening and closing of the relays is under the control of the computer. For any given setting of the relays, the servo S moves to a corresponding position. This is accomplished by the use of a feedback potentiometer 15 on the motor shaft. The computer is programmed to adjust the position of the arm of the potentiometer $R_p$ to obtain a minimum voltage across the detector D.

This system has the advantage that the balancing arm of the bridge contains less stray capacity than for the unit actually built; hence, it is less subject to errors from this source. However, the accuracy of setting the voltage division would be lower than for the directly controlled balancing arm. In addition, the servo-operated system appears to require somewhat more equipment.

The preferred circuit of the comparator is illustrated by FIG. 6.

A consideration of typical measurement requirements indicated that the resistance in series or parallel with the reactance to be measured will typically be of the order of 500 ohms and that a resolution of 10 pf. and/or 1 $\mu$h. would be a suitable design goal for the proposed comparator. Experiments with a breadboard setup resulted in the selection of 1000 ohms as the nominal maximum resistance of the balancing arm of the bridge and 10 kc. as a suitable A.-C. signal frequency.

The balancing arm of the bridge, corresponding to $R_p$ in FIG. 1, consists of two branches, designated as branches A and B. Each branch consists of series and parallel sections or networks of precision resistors, the total resistance of the branch as shown for branch B, being controlled by a set of fifteen relays K1 to K15, of which four are shown in each network. The control of the relays in branch A and those in branch B is so coordinated that the total resistance of the two branches in series remains constant, while the point of attachment of the detector may be varied throughout the entire resistance range. Coarse control of the resistance of each branch is accomplished by five relays which operate by shorting out appropriate combinations of resistors in the series section of the branch network. Fine control is accomplished by ten relays which control connections in the series section of the branch network.

The four relays associated with the parallel section may be operated in any combination so as to shunt 100-ohm resistors 16 with various combinations of high resistance. The effect is to permit the modification of the equivalent resistance of the parallel network, so that it may be set at any value between 99 1/16 and 100 ohms in increments of 1/16 ohm. The relays and resistor sections of the branch A operate in the same manner as above described for the branch B.

Branch S of the bridge network consists of resistance, the value of which may be manually selected by means of a switch (not shown) on the front panel from among one of four resistors 17 mounted within the cabinet, or an external resistor 18 which may be connected into the front panel at terminals 19.

Branch U of the bridge consists of the unknown network in the unit under test, along with the external wiring and switch connecting the comparator to the unit as at the test terminals 20. The unknown network may be connected into the bridge in place of internal circuits or a standard resistor 21 by suitable selector switch means 22 as indicated.

The signal generator and null detector required for bridge operation are not an integral part of the equipment; consequently, they are external to the cabinet and can be connected into the system by means of receptacles. Power for relay operation is provided by a regulated 28-volt D.-C. power supply which may be contained in the equipment cabinet.

The impedance comparator is mounted in a rack-and-panel type metal cabinet 24 which is presently about 25 inches high by 22 inches wide, by 17 inches deep, and constructed as indicated in FIG. 7. The total panel space used is 14 1/4 x 19 inches excluding the blank panel at the top. The bottom panel 26 is for a 20-amp, 28-volt D.-C. regulated power supply. Terminals (not shown) are provided on front and rear panels for connection to external circuits including the signal generator and the unknown impedance unit or element.

The components of the bridge are assembled on four subchassis 27–28–29–30, each of which houses the series resistance network components for one branch of the bridge. The subchassis plug into a base 31 is mounted on a standard 5 x 19-inch rack panel 32. FIG. 8 shows the base 31 with the four subchassis in place. The covers contain vents to allow dissipation of the heat produced by the relay coils with a minimum of temperature rise. Switches on the base panel are provided for manual operation of the digital impedance comparator. The subchassis are mounted behind a front panel 33.

Chassis 27 which is mounted at the front of the base, contains all of the bridge components except for the relays and resistors that comprise the balance-control and guard networks. Shielded cables 34 are used for connecting the branches of the bridge circuit. These can be seen at the ends of the subchassis in FIG. 8. The control circuit and auxiliary wiring is below the base plate and connects by way of suitable plugs in the bottom of the subchassis. All of the operating adjustment means 35 and external connection elements 36 are mounted on the front of chassis 27. These are accessible through openings as indicated in the panel 33 which mounts in front of chassis 27. All of the subchassis are electrically isolated from each other as well as from the base and front panels. This method of construction permits great flexibility in testing and servicing the system and also ensures maximum isolation of the bridge arms from each other.

In the automatic mode of operation, as distinguished from the manual mode, the control of the relays is accomplished by means of computer commands based on the interpretation of information inserted into the computer by a digital type of null detector. Each of the 15 pairs of relays is controlled by a contact closure as commanded by the computer. The control contacts are external to the comparator and may be connected to its through suitable receptacle means (not shown) at the rear of the cabinet.

The balance control can accommodate a range of 100 to 1 in the resistance component in the unknown, for any one value of resistance in branch S. The four standard resistors permit a maximum range of 10 ohms to 60,000 ohms in the unknown resistance, with overlapping steps. The minimum value of the reactance component which can be measured is primarily limited by the resolution of the balancing arm of the bridge. In general, the reactance range will be a function of the resistance in the unknown. For a nominal resistance of 600 ohms in the unknown, the balance resolution is equivalent to about 3 pf. for a parallel capacity, or 1 μh. for a series inductance. The equivalent resolution required for an A.-C. meter used to measure the null voltage is 30-μ v./v. output of the signal generator.

A calibration control means provides a manual adjustment to balance out the residual reactance in the comparator. Although exact cancellation of the residual reactance can be accomplished for only one setting of the bridge balance, the resulting error over the range of interest can be made tolerable by judicious selection of this setting. The system is calibrated for the ranges provided by the internal standards and adjusting both the bridge balancing switches and the other balance control, for a null on the detector. The optimum resistor for each range is automatically placed in the unknown branch, branch U. After the system is calibrated for the desired operating range, an operating switch, such as the switch 22, is placed in a proper test position for front panel or rear panel connection with the unknown impedance element or unit $\overline{Z}_u$.

The operation of the system under the control of a digital computer might typically consist of the following steps:

(1) An appropriate value of standard resistance $R_s$ is manually switched into branch S of the bridge circuit in series with the unknown network $\overline{Z}_u$.

(2) The total voltage input from the signal generator, $E_g$, is measured.

(3) The voltage, $E_u$, across the unknown impedance or network, $Z_u$, is measured.

(4) The five coarse control relays are set so that the remainder of the voltage-divider action occurs in the correct range. This may be done by computer command.

(5) A series of computer commands is then transmitted to the comparator, which controls the remaining relays so as to set the detector lead sequentially at one end, at three intermediate points, and at the other end of the restricted voltage-divider range. For each setting, the null voltage $E_d$ is measured and temporarily recorded. This may be by computer storage.

(6) The individual voltage readings of $E_d$ are scanned (by the computer) to determine the segment of the voltage-divider range in which the minimum value of $E_d$ occurs.

(7) The voltage-divider range segment in which the minimum occurs is then investigated in the same manner, repeating steps (5) and (6) for this segment. The process is continued until the exact voltage-divider setting is determined for the minimum value of $E_d$.

(8) The fraction $E_a/E_g$ is then determined by the computer on the basis of information contained in the relay-setting commands corresponding to the minimum voltage position. This information is combined with the value of $E_d$ for insertion into the equations to compute the unknown values of impedance.

The performance criterion of most importance in the operation of the comparator is its accuracy in measuring unknown reactance. Consequently, major emphasis was placed in the design process on minimizing sources of measurement error. Equation 5 derived above, is used for determining unknown capacitances:

$$C_u \doteq \frac{E_d}{E_a}\cdot\frac{R_s+R_u}{\omega R_u^2};\ \omega C_u R_u \ll 1$$

In this equation, the quantities $R_s$ $R_u$, $\omega$, and $E_a$ can generally be determined with high accuracy. The series resistors used in branches A and B have an accuracy of 0.05%. The relay contact resistance across the series resistors is small enough to be negligible in its effect on the measurement. Although Equation 5 involves an approximation, the error due to this can be made negligible in the range of interest ($Q=\omega C_u R_u << 1$) by proper selection of bridge parameters.

The major source of error in the result will arise from the inaccuracy in determining $E_d$. Potential sources of error in determining $E_d$ include:

(1) Limited resolution of resistance variation in branches A and B.

(2) Errors in the indicating device.

(3) Phase shift in the reference arms of the bridge due to stray capacity and inductance.

(4) Electrical noise level.

The effect of a finite resolution in the balance control, $R_p$, can be seen by referring to FIG. 2. Consider the limiting case in which there is no reactance in the unknown branch, resulting in an angle $\psi$ equal to zero. Under this condition the minimum null voltage which can be achieved is $$E_o = |E_a - E_s| \lesssim E_g\frac{\Delta R_p}{2R_p} \quad (6)$$

where $\Delta R_p$ is the minimum resolvable variation of resistance $R_p$. Substituting Equation 6 in Equation 1:

$$\tan\psi_r = \frac{E_o}{E_a} \approx \frac{E_o}{E_s} = \frac{\Delta R_p}{R_p}\cdot\frac{R_s+R_u}{2R_s} \quad (7)$$

where $\psi_r$ is the magnitude of the error in $\psi$. For the case where there is reactance in the unknown, the true reactance null voltage $\overline{E}_d$ is in quadrature with $\overline{E}_o$; therefore $$E_d' = [E_d^2 + E_o^2]^{1/2} \quad (8)$$

where $E_d'$ is the magnitude of the resultant.

Figure 9:
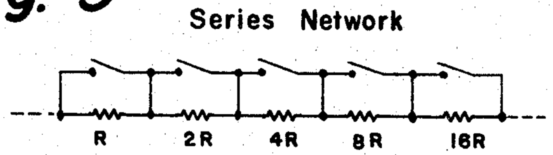

To compute the resistance resolution in the balance arm necessary to achieve the design goal, Equation 7 may be combined with Equations 2 or 3. For example:

$$\frac{\Delta R_p}{R_p} = \frac{2R_sR_u^2}{(R_s - R_u)^2}\omega C_r \quad (9)$$

where $\Delta R_p/R_p$ is the resistance resolution as a fraction of the total balance arm resistance. Setting $R_u = R_S = 600$ ohms and $C_r = 10$ pf. in Equation 9 gives $\Delta R_p/R_p$ smaller than $1/10{,}000$ for a 10-kc. applied frequency. This resolution could be obtained with 15 resistance steps in straight binary sequence, as shown in FIG. 9. However, preliminary experiments indicated that 15 series steps of the type shown in FIG. 9 would not be the most suitable choice, for two reasons. First, the closed relay contacts are all in series; thus, the smallest resistor in the network should be several times the total contact resistance. If 1 ohm, for example, is used for the smallest step, then the largest resistor in a straight binary sequence will be 16,384 ohms, and the total balance-arm resistance will be over 32,000 ohms. Second, a resistance of this size in the balancing branch is undesirable because the effects of stray capacity and the associated problems of reactance compensation increase with an increase of balance-arm impedance.

Figure 10:
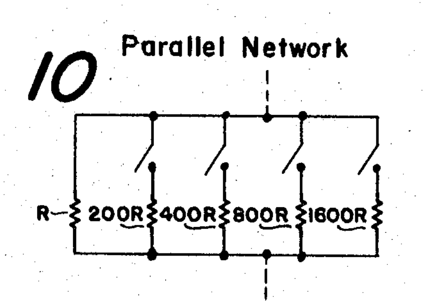

Experiments with a breadboard setup resulting in the selection of 1000 ohms as the nominal maximum resistance for the balancing arm. This requires that the smallest resistance increment be less than 1/10 ohm in order to achieve a resolution of 1 part in 10,000 or better with the series-resistance network. In order to avoid having 15 relay contacts in series, a parallel switching network, as shown in FIG. 10, was used to obtain resistance increments in the range from 1/16 ohm to 15/16 ohm. The parallel network does not have strictly linear increments, but the error is less than the smallest increment over this limited range. The shunting resistors can be of moderate accuracy without seriously affecting the total change in resistance. Furthermore, since the contacts of the fine control relays are in series with these high resistances, the contact resistance is negligible.

The final configuration of the balance resistance arm, as shown in FIG. 6, consisted of 11 series-resistance steps (1 to 512 ohms) and 4 parallel-resistance steps having an equivalent resistance ranging from 99 1/16 to 100 ohms. The series-resistance string is modified to incorporate one overlapping step of 32 ohms, thus providing the two independent ranges designated coarse and fine. This extra step simplifies the process of obtaining the null voltage by avoiding operation near the edge of a fine range.

A major potential source of system inaccuracy is caused by phase shift in the arms of the bridge produced by stray reactance in the individual components and wiring of the bridge. In order to minimize these effects, careful attention was given in the design of the comparator both to reducing stray reactance and to eliminating the effect of such reactance on the circuit operation.

Undesirable reactance can be introduced into the bridge circuit either directly by the components used for the branches or indirectly by the wiring and mechanical layout. Wire-wound resistors, for example, may introduce inductive reactance, and shielded components may have a relatively large capacitive reactance due to stray capacity.

Figure 11:
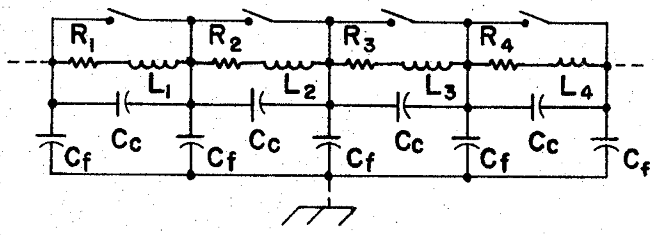

FIG. 11 is an approximate equivalent circuit for a portion of a series balance network in which wire-wound precision resistors are used. Each resistor section includes an inductive component, due to the windings in the resistors, and capacitive components, due mainly to inter-contact capacitance and contact-to-frame capacitance in the switching relays. It is interesting to note that inductance in the resistors purchased for the balance network was not detected with a conventional L-C meter having a full-scale sensitivity of 3 $\mu$h. because of the low $Q=\omega L/R$. However, measurements with a breadboard version of the comparator showed inductance values ranging from 2 $\mu$h. in the 16-ohm resistors to 78 $\mu$h. in the 512-ohm resistors, although they were rated by the manufacturer as "non-inductive." The Q for these resistors is about 0.01 at 10 kc.

Figure 12:
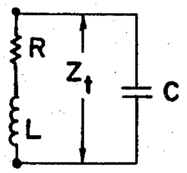

When the Q factor is small, the interaction between inductance and capacitance is negligible and the first-order effects may be computed by direct superposition of the reactive components. For example, the impedance of the network in FIG. 12 is obtained by adding the solutions for the reactive components given in FIGS. 3 and 4. The result for the network in FIG. 12 is $$Z_t=R+j\omega(L-CR^2)\begin{cases}\omega L/R\ll 1\\ \omega CR\ll 1\end{cases} \quad (10)$$

Equation 10 shows that for a constant L and C, the reactive component will be positive for small values R and negative for large values.

Since the mutual inductance between the wire-wound resistors of FIG. 11 is negligible in this case, each resistor can be individually compensated by adding shunt capacitance. In fact, the relay intercontact capacitance $C_c$ provides partial compensation for inductance in the resistors. The intercontact capacitance in the relays purchased for the balance network is about 5 pf. This is negligible except for the largest one or two resistors (512 and 256 ohms). The contact-to-frame capacity $C_f$ is about the same as the intercontact capacity in these relays. The effect of $C_f$ is more significant than $C_c$ in the balance network because it generally acts across more than one resistor. Direct compensation of the contact-to-frame capacity is complicated by the fact that both the effective resistance and capacitance in a balance arm changes as the relay contacts open or close.

A more effective method of eliminating the effects of stray capacity is to apply guard voltages to the various metallic parts in the vicinity of the bridge components. The basic concept in the use of guard voltages is that the current flowing through a stray capacity can be reduced to zero if the voltages of the two parts of the system across which the capacity exists are maintained at the same value. Since no current then flows across the capacity, no effect on the bridge-circuit voltage can result.

In order to apply this principle, the various metal parts of the system which are adjacent to the components of the bridge circuit are maintained at appropriate voltages by means of an auxiliary voltage-divider system whose voltage is supplied from the same transformer which supplies the bridge. Since the voltage of the various components and wires of the bridge circuit changes with the combination of energized relays, it is necessary to control the voltage of the adjacent metal parts accordingly. As indicated in FIG. 6 this may be done by using as a voltage divider for the guard voltages a similar series of guard resistors corresponding to those used in Branches A and B, and which may be indicated in a series 37. The voltages across these resistors are then controlled in the same manner by additional contacts 38 on the same relays which control the Branches A and B. The resistors 39 are balance resistors for this network.

Each relay fram is connected electrically to the subchassis in which it is mounted. The inner contacts of the relay (i.e., the contacts next to the relay frame) are used to control the voltage divider used for establishing guard voltages. Consequently, the inner set of relay contacts is maintained at exactly the same voltage as the outer set of contacts; the outer set is used in the balance arms of the bridge. Hence, capacity between the inner and the outer contacts should have no effect on the bridge circuit. Also, the guard voltages on the inner contacts tend to shield the outer contacts from the relay frame voltages.

As indicated in FIG. 6, a shielded transformer 40 is used to isolate the bridge circuit from the signal generator. In addition, components and wiring are completely shielded. The effect of stray capacity across the branches of the bridge is minimized by connecting all shields to the center point of terminal T of the guard network so that the undesired reactance appears across the guard network instead of the branches of the bridge. The guard center point or terminal T is also available for external connection when the unknown impedance and/or standard resistance are remotely located.

Electrical noise in the bridge circuit which is picked up by the detector can contribute to the error in measuring the null voltage, $E_d$. A noise voltage of magnitude $E_n$ will increase the rms. value of the null voltage in accordance with this equation:

$$E_d'=(E_d^2+E_n^2)^{1/2} \quad (11)$$

where $E_d$ is the trule null voltage and $E_d'$ is the measured null voltage. The major source of noise in the system was found to be 60-c.p.s. voltages originating in the signal generator, vacuum-tube voltmeter, and relay power supply. The noise voltage was minimized by the use of shielding for wiring and for the bridge voltage supply transformer. Additional reduction in the noise can be achieved by the use of circuit filters, such as a filter in the detector circuit, which rejects unwanted signals at other frequencies.

We claim:

1. In a system for measuring the impedance of electrical circuit components having unknown inductive and capacitive reactance characteristics, the combination of, means for selectively connecting each one of a plurality of standard resistance elements in series with one of said components as the series branches of a first arm of an electrical bridge circuit, means for connecting an energizing alternating-current signal source with said bridge circuit in parallel relation with said first arm thereof, means providing two resistive and substantially non-reactive voltage-divider arms connected in parallel relation with the first arm to receive alternating-current signals therewith from the same source, each of said voltage-divider arms having an output terminal connected thereon between the ends thereof, means providing conductive wiring and component shields for said system, one of said voltage-divider arms constituting the second arm of said bridge circuit and having stray capacitive coupling with said shield means, alternating-current voltage detector means connected between the output terminal of the one of said voltage divider means in said second bridge arm and the junction between the standard resistance element and electrical component for test in circuit in the first arm of said bridge circuit, and means providing a connection through the output terminal of the other of said voltage divider means with said shield means to apply voltages thereto for neutralizing said stray capacitive coupling.

2. An alternating-current bridge-type impedance measurement system for resistive circuit components having reactive impedance of unknown magnitude, comprising in combination, a plurality of fixed standard test resistors, means for selectively connecting each of said resistors to provide one branch of a bridge network and adjustable and essentially resistive impedance therein means for connecting one of said circuit components for test serially with said one branch in said bridge network as the other and second branch of a first arm thereof, means connected to supply alternating current to said first arm at the ends thereof, two series-connected adjustable voltage-divider means providing the series branches of a second arm for the bridge network in parallel with the first arm and the alternating-current supply means as a bridge balancing arm to complete the bridge circuit connections in said network, null detector means responsive to the alternating current supply frequency connected between opposite output points on said bridge arms intermediate between the series branches at the junctions thereof to provide an indication of the magnitude of the output voltage at balance as a measure of the magnitude of the reactive impedance of the said circuit component, and two additional serially-connected voltage divider means providing the branches of a third resistance arm connected in parallel relation with the balancing arm of the bridge network to supply voltage for stray capacitance correction in the system, said last named voltage divider means being adjustable with said first named voltage divider means by common control means jointly connected therewith, thereby to vary the said voltage in fixed relation to variations in the bridge circuit balance.

3. An alternating-current bridge-type impedance measurement system as defined in claim 2, wherein the balancing arm of the bridge network and the voltage supply resistance arm in parallel therewith are provided in each branch thereof with a series resistor network and a parallel resistor network relay-controlled for remote switching operation into and out of circuit and balance adjustment in predetermined relation.

4. An alternating-current bridge-type system for measuring the impedance of an electrical circuit component, comprising in combination, means providing one arm of a bridge circuit for said system and including a standard resistance element connected in series with an electrical circuit component of unknown reactive impedance value, alternating-current signal supply means connected to said bridge circuit in parallel with said arm, means providing component and wiring shields in said system, means providing first and second similar voltage dividers each including a plurality of series and parallel resistor sections and each divider having input terminals connected to said signal supply means and having an output terminal connected thereon intermediate its input terminals, the first voltage divider constituting the second arm of said bridge circuit and being located in proximity to and having stray capacity coupling with said shield means, an alternating-current voltage detector connected between the output terminal of said first voltage divider and the junction between said standard resistor means and said electrical component, means for connecting the output terminal of said second voltage divider with said shield means to apply thereto a voltage of a magnitude for neutralizing said stray capacity coupling, and means for simultaneously short-circuiting corresponding resistor sections of said first and second voltage dividers to simultaneously adjust the bridge balance and the magnitude of the neutralizing voltage for said stray capacity coupling.

References Cited by the Examiner

UNITED STATES PATENTS

| | | | |
|---|---|---|---|
| 2,758,274 | 8/1956 | Clark et al. | 323—75 |
| 2,812,481 | 11/1957 | Roosdorp | 324—99 X |
| 2,817,810 | 12/1957 | Southeimer | 324—57 |
| 2,820,935 | 1/1958 | Kleason | 324—99 X |
| 2,889,505 | 6/1959 | Sigel | 318—28 |
| 2,932,784 | 4/1960 | Hampton | 323—75 X |
| 3,070,301 | 12/1962 | Sarnoff | 235—150.1 |
| 3,082,373 | 3/1963 | Hooke et al. | 324—57 |
| 3,195,045 | 7/1965 | Ward | 324—99 X |
| 3,209,908 | 10/1965 | Hopkins | 324—57 X |

OTHER REFERENCES

Electronic Circuits and Tubes: "Application of Bridge Methods," 1947, pp. 84–85.

Gertsch: "Use of Ratio Tran in Bridge Circuits," Engineering bulletin No. 4 (Radio Trans), Gertsch Products Inc., May 14, 1956.

Industrial Electronics Engineering and Maintenance: "How NBS Calibrates Voltage Dividers," July, 1961, pp. 18–19.

WALTER L. CARLSON, *Primary Examiner.*

E. E. KUBASIEWICZ, *Assistant Exmainer.*